United States Patent
Koetting et al.

(10) Patent No.: US 8,399,119 B2
(45) Date of Patent: Mar. 19, 2013

(54) BATTERY MODULE AND METHOD FOR COOLING THE BATTERY MODULE

(75) Inventors: William Koetting, Davisburg, MI (US); Josh Payne, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 322 days.

(21) Appl. No.: 12/549,766

(22) Filed: Aug. 28, 2009

(65) Prior Publication Data

US 2011/0052959 A1    Mar. 3, 2011

(51) Int. Cl.
*H01M 10/50* (2006.01)
(52) U.S. Cl. ....................................... 429/120
(58) Field of Classification Search .................. 429/120
See application file for complete search history.

(56) References Cited

U.S. PATENT DOCUMENTS

| | | |
|---|---|---|
| 2,273,244 A | 2/1942 | Cornelius |
| 2,391,859 A | 1/1946 | Earl |
| 3,503,558 A | 3/1970 | Galiulo et al. |
| 3,522,100 A | 7/1970 | Lindstrom |
| 3,550,681 A | 12/1970 | Stier et al. |
| 3,964,930 A | 6/1976 | Reiser |
| 4,063,590 A | 12/1977 | McConnell |
| 4,298,904 A | 11/1981 | Koenig |
| 4,322,776 A | 3/1982 | Job et al. |
| 4,390,841 A | 6/1983 | Martin et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,995,240 A | 2/1991 | Barthel et al. |
| 5,057,968 A | 10/1991 | Morrison |
| 5,071,652 A | 12/1991 | Jones et al. |
| 5,214,564 A | 5/1993 | Metzler et al. |

(Continued)

FOREIGN PATENT DOCUMENTS

| | | |
|---|---|---|
| EP | 1577966 A | 9/2005 |
| EP | 1852925 A | 11/2007 |

(Continued)

OTHER PUBLICATIONS

U.S. Appl. No. 12/165,100, filed Jun. 30, 2008 entitled Battery Cell Assembly Having Heat Exchanger with Serpentine Flow Path.

(Continued)

*Primary Examiner* — Ula C Ruddock
*Assistant Examiner* — Frank Chernow
(74) *Attorney, Agent, or Firm* — Buckert Patent & Trademark Law Firm, P.C.

(57) ABSTRACT

A battery module and a method for cooling the battery module are provided. The battery module includes a battery cell and a cooling fin disposed adjacent to the battery cell. The cooling fin has a solid plate and first and second tab portions extending from first and second edges, respectively, of the solid plate. The first and second tab portions are bent perpendicular to a front surface of the battery cell. The cooling fin extracts heat energy from the battery cell thereto. The battery module further includes a first cooling manifold that contacts the first tab portion of the cooling fin. The first cooling manifold has at least one flow channel extending therethrough that receives a fluid therethrough. The first cooling manifold conducts heat energy from the cooling fin into the fluid flowing through the first cooling manifold to cool the battery cell.

9 Claims, 7 Drawing Sheets

U.S. PATENT DOCUMENTS

| | | |
|---|---|---|
| 5,270,131 A | 12/1993 | Diethelm et al. |
| 5,322,745 A | 6/1994 | Yanagihara et al. |
| 5,329,988 A | 7/1994 | Juger |
| 5,346,786 A | 9/1994 | Hodgetts |
| 5,356,735 A | 10/1994 | Meadows et al. |
| 5,510,203 A | 4/1996 | Hamada et al. |
| 5,606,242 A | 2/1997 | Hull et al. |
| 5,652,502 A | 7/1997 | Van Phuoc et al. |
| 5,658,682 A | 8/1997 | Usuda et al. |
| 5,663,007 A | 9/1997 | Ikoma et al. |
| 5,736,836 A | 4/1998 | Hasegawa et al. |
| 5,756,227 A | 5/1998 | Suzuki et al. |
| 5,796,239 A | 8/1998 | Van Phuoc et al. |
| 5,825,155 A | 10/1998 | Ito et al. |
| 5,937,664 A | 8/1999 | Matsuno et al. |
| 5,982,403 A | 11/1999 | Inagaki |
| 6,016,047 A | 1/2000 | Notten et al. |
| 6,087,036 A | 7/2000 | Rouillard et al. |
| 6,111,387 A | 8/2000 | Kouzu et al. |
| 6,176,095 B1 | 1/2001 | Porter |
| 6,344,728 B1 | 2/2002 | Kouzu et al. |
| 6,353,815 B1 | 3/2002 | Vilim et al. |
| 6,362,598 B2 | 3/2002 | Laig-Horstebrock et al. |
| 6,399,238 B1 | 6/2002 | Oweis et al. |
| 6,441,586 B1 | 8/2002 | Tate, Jr. et al. |
| 6,462,949 B1 | 10/2002 | Parish, IV et al. |
| 6,512,347 B1 | 1/2003 | Hellmann et al. |
| 6,515,454 B2 | 2/2003 | Schoch |
| 6,534,954 B1 | 3/2003 | Plett |
| 6,563,318 B2 | 5/2003 | Kawakami et al. |
| 6,569,556 B2 | 5/2003 | Zhou et al. |
| 6,662,891 B2 | 12/2003 | Misu et al. |
| 6,689,510 B1 | 2/2004 | Gow et al. |
| 6,696,197 B2 | 2/2004 | Inagaki et al. |
| 6,724,172 B2 | 4/2004 | Koo |
| 6,750,630 B2 | 6/2004 | Inoue et al. |
| 6,775,998 B2 | 8/2004 | Yuasa et al. |
| 6,780,538 B2 | 8/2004 | Hamada et al. |
| 6,821,671 B2 | 11/2004 | Hinton et al. |
| 6,826,948 B1 | 12/2004 | Bhatti et al. |
| 6,829,562 B2 | 12/2004 | Sarfert |
| 6,832,171 B2 | 12/2004 | Barsoukov et al. |
| 6,876,175 B2 | 4/2005 | Schoch |
| 6,878,485 B2 | 4/2005 | Ovshinsky et al. |
| 6,892,148 B2 | 5/2005 | Barsoukov et al. |
| 6,927,554 B2 | 8/2005 | Tate, Jr. et al. |
| 6,943,528 B2 | 9/2005 | Schoch |
| 6,967,466 B2 | 11/2005 | Koch |
| 6,982,131 B1 | 1/2006 | Hamada et al. |
| 7,012,434 B2 | 3/2006 | Koch |
| 7,039,534 B1 | 5/2006 | Ryno et al. |
| 7,061,246 B2 | 6/2006 | Dougherty et al. |
| 7,070,874 B2 | 7/2006 | Blanchet et al. |
| 7,072,871 B1 | 7/2006 | Tinnemeyer |
| 7,098,665 B2 | 8/2006 | Laig-Hoerstebrock |
| 7,109,685 B2 | 9/2006 | Tate, Jr. et al. |
| 7,126,312 B2 | 10/2006 | Moore |
| 7,143,124 B2 | 11/2006 | Garthwaite |
| 7,147,045 B2 | 12/2006 | Quisenberry et al. |
| 7,150,935 B2 | 12/2006 | Hamada et al. |
| 7,197,487 B2 | 3/2007 | Hansen et al. |
| 7,199,557 B2 | 4/2007 | Anbuky et al. |
| 7,250,741 B2 | 7/2007 | Koo et al. |
| 7,251,889 B2 | 8/2007 | Kroliczek et al. |
| 7,253,587 B2 | 8/2007 | Meissner |
| 7,264,902 B2 | 9/2007 | Horie et al. |
| 7,278,389 B2 | 10/2007 | Kirakosyan |
| 7,315,789 B2 | 1/2008 | Plett |
| 7,321,220 B2 | 1/2008 | Plett |
| 7,327,147 B2 | 2/2008 | Koch |
| 7,467,525 B1 | 12/2008 | Ohta et al. |
| 7,531,270 B2 | 5/2009 | Buck et al. |
| 7,795,845 B2 | 9/2010 | Cho |
| 7,797,958 B2 | 9/2010 | Alston et al. |
| 7,816,029 B2 | 10/2010 | Takamatsu et al. |
| 7,846,573 B2 * | 12/2010 | Kelly .................... 429/120 |
| 7,879,480 B2 | 2/2011 | Yoon et al. |
| 7,883,793 B2 | 2/2011 | Niedzwiecki et al. |
| 7,976,978 B2 | 7/2011 | Shin et al. |
| 7,981,538 B2 | 7/2011 | Kim et al. |
| 7,997,367 B2 | 8/2011 | Nakamura |
| 8,007,915 B2 | 8/2011 | Kurachi |
| 8,030,886 B2 | 10/2011 | Mahalingam et al. |
| 8,067,111 B2 | 11/2011 | Koetting et al. |
| 2001/0035739 A1 | 11/2001 | Laig-Horstebrock et al. |
| 2002/0130637 A1 | 9/2002 | Schoch |
| 2002/0169581 A1 | 11/2002 | Sarfert |
| 2002/0182493 A1 | 12/2002 | Ovshinsky et al. |
| 2003/0052690 A1 | 3/2003 | Schoch |
| 2003/0184307 A1 | 10/2003 | Kozlowski et al. |
| 2003/0211384 A1 | 11/2003 | Hamada et al. |
| 2004/0000892 A1 | 1/2004 | Jae-Seung |
| 2004/0032264 A1 | 2/2004 | Schoch |
| 2004/0189257 A1 | 9/2004 | Dougherty et al. |
| 2005/0001627 A1 | 1/2005 | Anbuky et al. |
| 2005/0026014 A1 | 2/2005 | Fogaing et al. |
| 2005/0035742 A1 | 2/2005 | Koo et al. |
| 2005/0046388 A1 | 3/2005 | Tate, Jr. et al. |
| 2005/0089750 A1 | 4/2005 | Ng et al. |
| 2005/0100786 A1 | 5/2005 | Ryu et al. |
| 2005/0103486 A1 | 5/2005 | Demuth et al. |
| 2005/0110460 A1 | 5/2005 | Arai et al. |
| 2005/0127874 A1 | 6/2005 | Lim et al. |
| 2005/0134038 A1 | 6/2005 | Walsh |
| 2005/0194936 A1 | 9/2005 | Cho |
| 2006/0097698 A1 | 5/2006 | Plett |
| 2006/0100833 A1 | 5/2006 | Plett |
| 2006/0111854 A1 | 5/2006 | Plett |
| 2006/0111870 A1 | 5/2006 | Plett |
| 2006/0234119 A1 | 10/2006 | Kruger et al. |
| 2006/0286450 A1 | 12/2006 | Yoon et al. |
| 2007/0035307 A1 | 2/2007 | Schoch |
| 2007/0046292 A1 | 3/2007 | Plett |
| 2007/0087266 A1 | 4/2007 | Bourke et al. |
| 2007/0103120 A1 | 5/2007 | Plett |
| 2007/0120533 A1 | 5/2007 | Plett |
| 2007/0188143 A1 | 8/2007 | Plett |
| 2007/0236182 A1 | 10/2007 | Plett |
| 2008/0003491 A1 | 1/2008 | Yahnker et al. |
| 2008/0041079 A1 | 2/2008 | Nishijima et al. |
| 2008/0094035 A1 | 4/2008 | Plett |
| 2008/0182151 A1 | 7/2008 | Mizusaki et al. |
| 2008/0248338 A1 | 10/2008 | Yano et al. |
| 2009/0029239 A1 | 1/2009 | Koetting et al. |
| 2009/0087727 A1 * | 4/2009 | Harada et al. .................. 429/120 |
| 2009/0104512 A1 | 4/2009 | Fassnacht et al. |
| 2009/0155680 A1 | 6/2009 | Maguire et al. |
| 2009/0186265 A1 | 7/2009 | Koetting et al. |
| 2009/0258288 A1 * | 10/2009 | Weber et al. .................. 429/120 |
| 2009/0280395 A1 * | 11/2009 | Nemesh et al. ................. 429/62 |
| 2009/0325052 A1 | 12/2009 | Koetting et al. |
| 2009/0325054 A1 | 12/2009 | Payne et al. |
| 2009/0325055 A1 | 12/2009 | Koetting et al. |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0275619 A1 | 11/2010 | Koetting et al. |
| 2010/0276132 A1 | 11/2010 | Payne |
| 2010/0279152 A1 | 11/2010 | Payne |
| 2010/0279154 A1 | 11/2010 | Koetting et al. |
| 2011/0027640 A1 | 2/2011 | Gadawski et al. |
| 2011/0041525 A1 | 2/2011 | Kim et al. |
| 2011/0052959 A1 | 3/2011 | Koetting et al. |
| 2012/0082880 A1 | 4/2012 | Koetting et al. |

FOREIGN PATENT DOCUMENTS

| | | |
|---|---|---|
| JP | 08111244 | 4/1996 |
| JP | 09129213 | 5/1997 |
| JP | 09219213 | 8/1997 |
| JP | 2001105843 A | 4/2001 |
| JP | 2002038033 A | 2/2002 |
| JP | 2002319383 A | 10/2002 |
| JP | 2003188323 A | 7/2003 |
| JP | 2005126315 A | 5/2005 |
| JP | 2005349955 A | 12/2005 |
| JP | 2006139928 A | 6/2006 |

| | | | |
|---|---|---|---|
| JP | 2007305425 A | 11/2007 | |
| JP | 2008054379 A | 11/2007 | |
| JP | 2008062875 A | 3/2008 | |
| JP | 2008080995 A | 4/2008 | |
| JP | 2008159440 A | 7/2008 | |
| JP | 2009009889 A | 1/2009 | |
| JP | 2009054297 A | 3/2009 | |
| KR | 20050092605 A | 9/2005 | |
| KR | 100637472 B1 | 10/2006 | |
| KR | 100765659 B1 | 10/2007 | |
| KR | 20080047641 A | 5/2008 | |
| KR | 20090082212 A | 7/2009 | |
| KR | 100921346 B1 | 10/2009 | |
| WO | 2006101343 A | 9/2006 | |
| WO | 2007007503 A | 1/2007 | |
| WO | 2007115743 A2 | 10/2007 | |
| WO | 2009073225 A | 6/2009 | |

OTHER PUBLICATIONS

U.S. Appl. No. 12/164,780, filed Jun. 30, 2008 entitled Battery Module Having Battery Cell Assembly with Heat Exchanger.

U.S. Appl. No. 12/164,627, filed Jun. 30, 2008 entitled Liquid Cooled Battery Manifold Assembly with Flow Balancing Feature.

U.S. Appl. No. 12/246,073, filed Oct. 6, 2008 entitled Battery Cell Carrier That Engages Side Walls of Active Cell.

U.S. Appl. No. 12/164,445, filed Jun. 30, 2008 entitled Battery Module Having a Rubber Cooling Manifold.

U.S. Appl. No. 12/258,696, filed Oct. 27, 2008 entitled Battery Module Having Cooling Manifold with Ported Screws and Method for Cooling the Battery Module.

U.S. Appl. No. 12/433,155, filed Apr. 30, 2009 entitled Cooling System for a Battery and a Method for Cooling the Battery System.

U.S. Appl. No. 12/433,427, filed Apr. 30, 2009 entitled Cooling Manifold and Method for Manufacturing the Cooling Manifold.

U.S. Appl. No. 12/433,534, filed Apr. 30, 2009 entitled Battery Systems, Battery Modules, and Method for Cooling a Battery Module.

U.S. Appl. No. 12/433,397, filed Apr. 30, 2009 entitled Battery Systems, Battery Modules, and Method for Cooling a Battery Module.

U.S. Appl. No. 12/164,741, filed Jun. 30, 2008 entitled Battery Module Having Battery Cell Assemblies with Alignment-Coupling Features.

U.S. Appl. No. 12/433,485, filed Apr. 30, 2009 entitled Battery Systems, Battery Module and Method for Cooling the Battery Module.

U.S. Appl. No. 12/426,795, filed Apr. 20, 2009 entitled Frame Member, Frame Assembly and Battery Cell Assembly Made Therefrom and Methods of Making the Same.

U.S. Appl. No. 12/511,530, filed Jul. 29, 2009 entitled Battery Module and Method for Cooling the Battery Module.

U.S. Appl. No. 12/511,552, filed Jul. 29, 2009 entitled Battery Module and Method for Cooling the Battery Module.

"Gasket". Merriam-Webster. Merriam-Webster. Web. May 30, 2012. <http://www.merriam-webster.com/dictionary/gasket>.

International Search Report; International Application No. PCT/KR2009/000258; International Filing Date: Jan. 16, 2009; Date of Mailing: Aug. 28, 2009; 2 pages.

International Search Report; International Application No. PCT/KR2009/003428; International Filing Date: Jun. 25, 2009; Date of Mailing: Jan. 22, 2010; 2 pages.

International Search Report; International Application No. PCT/KR2009/003429; International Filing Date: Jun. 25, 2009; Date of Mailing: Jan. 12, 2010; 3 pages.

International Search Report; International Application No. PCT/KR2009/003430; International Filing Date: Jun. 25, 2009; Date of Mailing: Feb. 3, 2010; 2 pages.

International Search Report; International Application No. PCT/KR2009/003434; International Filing Date: Jun. 25, 2009; Date of Mailing: Jan. 18, 2010; 2 pages.

International Search Report; International Application No. PCT/KR2009/003436; International Filing Date: Jun. 25, 2009; Date of Mailing: Jan. 22, 2010; 2 pages.

International Search Report; International Application No. PCT/KR2009/006121; International Filing Date: Oct. 22, 2009; Date of Mailing: May 3, 2010; 2 pages.

International Search Report; International Application No. PCT/KR2010/002334; International Filing Date: Apr. 15, 2010; Date of Mailing: Nov. 29, 2010; 2 pages.

International Search Report; International Application No. PCT/KR2010/002336; International Filing Date: Apr. 15, 2010; Date of Mailing: Jan. 31, 2011; 2 pages.

International Search Report; International Application No. PCT/KR2010/002337; International Filing Date: Apr. 15, 2010; Date of Mailing: May 3, 2010; 2 pages.

International Search Report; International Application No. PCT/KR2010/002340; International Filing Date: Apr. 15, 2010; Date of Mailing: Jan. 31, 2011; 2 pages.

International Search Report; International Application No. PCT/KR2010/004944; International Filing Date: Jul. 28, 2010; Date of Mailing: Apr. 29, 2011; 2 pages.

International Search Report; International Application No. PCT/KR2010/005639; International Filing Date: Aug. 24, 2010; Date of Mailing: Jun. 3, 2011; 2 pages.

Machine translation of Japanese Patent Application No. 2009-009889 A, published Jan. 15, 2009.

Thomas J. Gadawski et al., pending U.S Appl. No. 13/433,649 entitled "Battery System and Method for Cooling the Battery System," filed with the U.S. Patent and Trademark Office on Mar. 29, 2012.

U.S. Appl. No. 13/475,963 filed on May 19, 2012 entitled Battery Cell Assembly and Method for Manufacturing a Cooling Fin for the Battery Cell Assembly.

* cited by examiner

BATTERY MODULE AND METHOD FOR COOLING THE BATTERY MODULE

TECHNICAL FIELD

This application relates to a battery module and a method for cooling the battery module.

BACKGROUND OF THE INVENTION

In a typical air-cooled battery pack, ambient air from ambient atmosphere is directed across battery cells in the battery pack and is subsequently exhausted from the battery pack. However, the typical air-cooled battery pack has a major challenge in maintaining a temperature of the battery pack within a desired temperature range.

In particular, a maximum operating temperature of the battery cells can often be less than a temperature of ambient air utilized to cool the batteries. In this situation, it is impossible to maintain the battery cells within a desired temperature range in an air-cooled battery pack.

Accordingly, the inventors herein have recognized a need for an improved battery module and a method for cooling the battery module that minimizes and/or eliminates the above-mentioned deficiency.

SUMMARY OF THE INVENTION

A battery module in accordance with an exemplary embodiment is provided. The battery module includes a battery cell and a cooling fin disposed adjacent to the battery cell. The cooling fin has a solid plate and first and second tab portions extending from first and second edges, respectively, of the solid plate. The first and second tab portions are configured to be bent perpendicular to a front surface of the battery cell. The cooling fin is configured to extract heat energy from the battery cell thereto. The battery module further includes a first cooling manifold that contacts the first tab portion of the cooling fin. The first cooling manifold has at least one flow channel extending therethrough configured to receive a fluid therethrough. The first cooling manifold is configured to conduct heat energy from the cooling fin into the fluid flowing through the first cooling manifold to cool the battery cell.

A method for cooling a battery module in accordance with another exemplary embodiment is provided. The battery module has a battery cell and a cooling fin disposed adjacent to the battery cell. The battery module further includes a first cooling manifold that contacts the cooling fin. The cooling fin has a solid plate and first and second tab portions extending from first and second edges, respectively, of the solid plate. The method includes conducting heat energy from the battery cell into the solid plate of the cooling fin. The method further includes conducting heat energy from the first tab portion of the cooling fin into the first cooling manifold. The method further includes receiving a fluid in the first cooling manifold and conducting heat energy from the first cooling manifold into the fluid flowing therethrough to cool the battery cell.

DETAILED DESCRIPTION OF EXEMPLARY EMBODIMENTS

Figure 1:
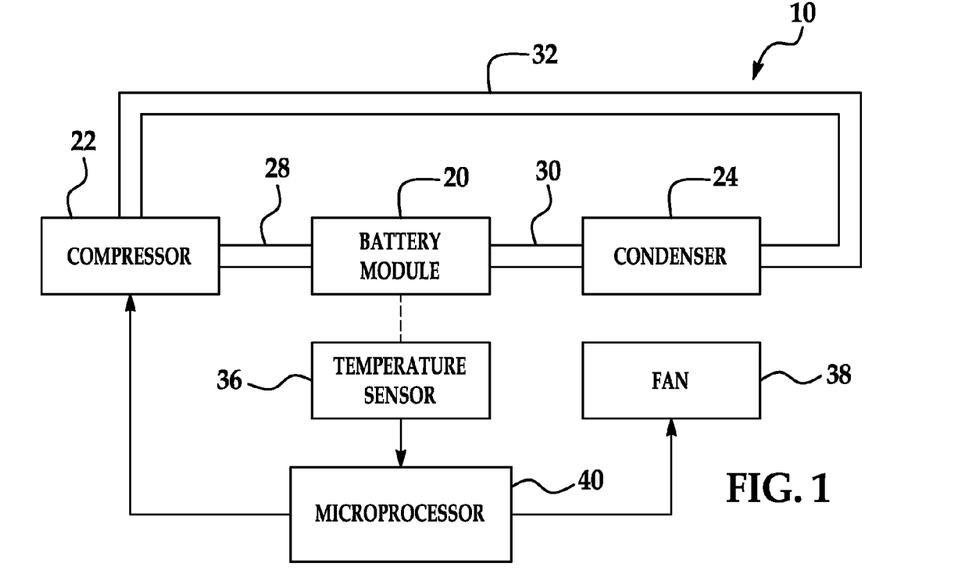
FIG. 1 is a schematic of a battery system having a battery module in accordance with an exemplary embodiment.

Referring to FIG. 1, a battery system 10 for generating electrical power in accordance with an exemplary embodiment is illustrated. The battery system 10 includes a battery module 20, a compressor 22, a condenser 24, conduits 28, 30, 32, a temperature sensor 36, a fan 38, and a microprocessor 40. An advantage of the battery module 20 is that the battery module utilizes cooling fins with external tab portions that contact a cooling manifold to transfer heat energy from battery cells to the cooling manifold to cool the battery cells.

For purposes of understanding, the term "fluid" means either a liquid or a gas. For example, a fluid can comprise either a coolant or a refrigerant. Exemplary coolants include ethylene glycol and propylene glycol. Exemplary refrigerants include R-11, R-12, R-22, R-134A, R-407C and R-410A.

Referring to FIGS. 1-5, the battery module 20 is provided to generate a voltage therein. The battery module 20 includes battery cell assemblies 60, 62, 64, 66, 68, 70, 72, 74, 76, 78, 80, 82, cooling fins 90, 92, 94, 96, 98, 100, 102, 104, 106, 108, 110, 112, and cooling manifolds 120, 122, 124, 126.

The battery cell assemblies 60, 62, 64, 66, 68, 70, 72, 74, 76, 78, 80, 82 are provided to generate an electrical voltage. Each of the battery cell assemblies 60, 62, 64, 66, 68, 70, 72, 74, 76, 78, 80, 82 have rectangular ring-shaped frame members with engagement features which allow the battery cell assemblies to be coupled and secured together.

Figure 3:
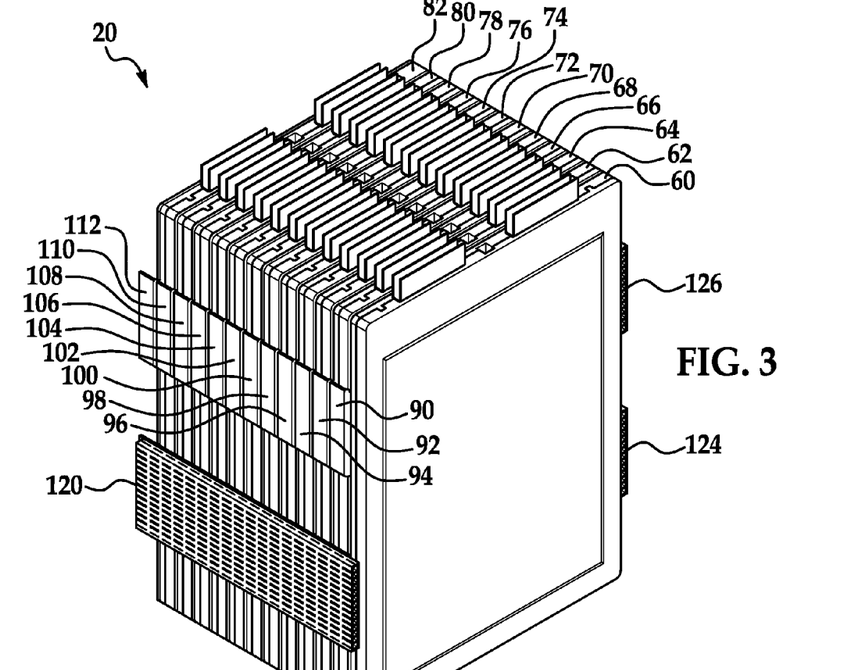
FIG. 3 is another schematic of the battery module of FIG. 2 having a cooling manifold removed therefrom.
Figure 4:
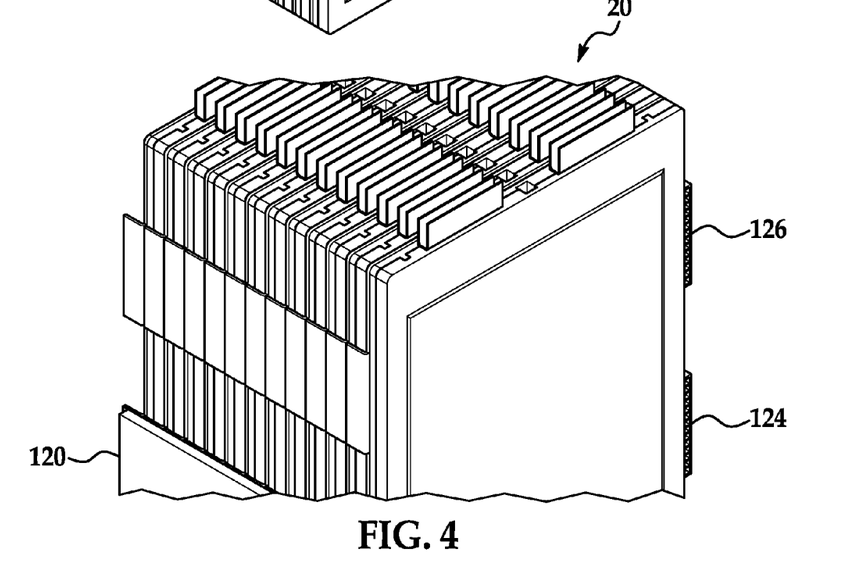
FIG. 4 is an enlarged schematic of a portion of the battery module of FIG. 2.
Figure 5:
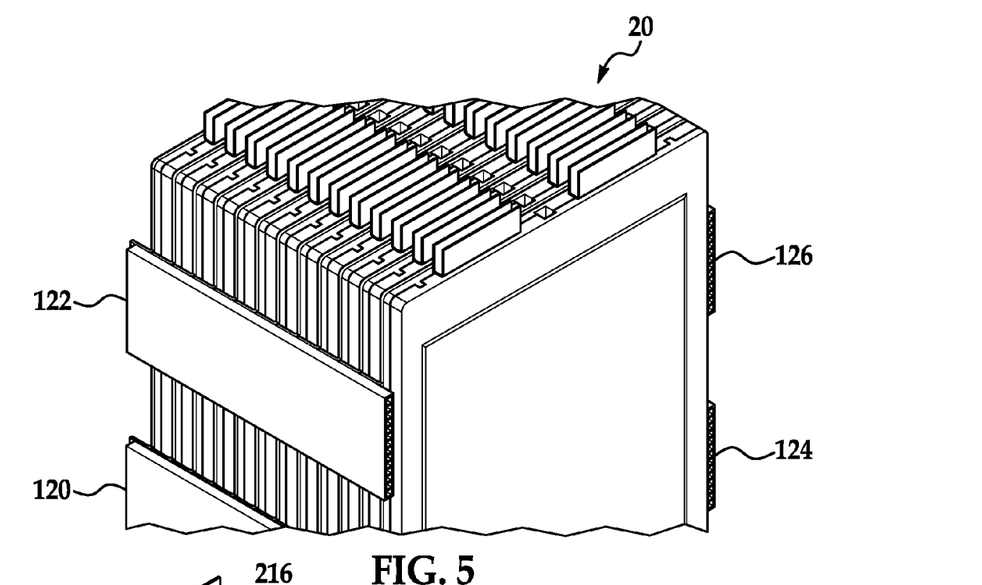
FIG. 5 is another enlarged schematic of a portion of the battery module of FIG. 2.
Figure 6:
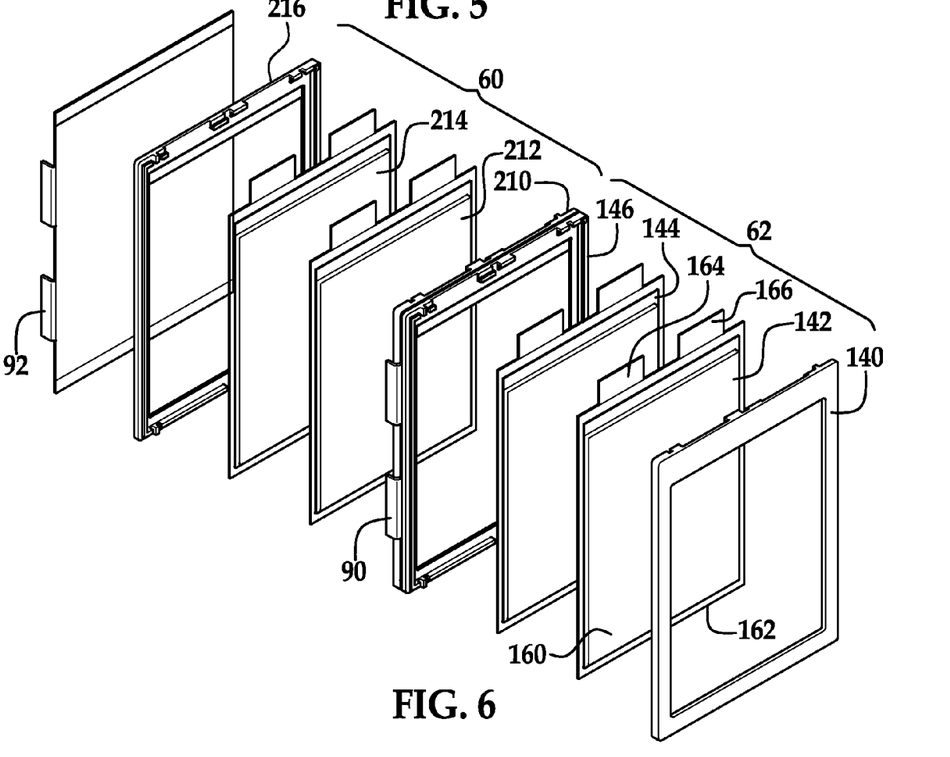
FIG. 6 is a schematic of an exploded view of a portion of the battery module of FIG. 2.

Referring to FIGS. 3 and 6, the battery cell assemblies each have a substantially similar structure. Accordingly, only the battery cell assemblies 60, 62 will be described in greater detail below. The battery cell assembly 60 includes a rectangular ring-shaped frame member 140, battery cells 142, 144, and a rectangular ring-shaped frame member 146. Each of the rectangular ring-shaped frame members 140, 146 have engagement features which allow the frame members 140, 146 to be coupled and secured together. As shown, both of the battery cells 142, 144 are secured between the rectangular ring-shaped frame members 140, 146.

It should be noted that each of the battery cells have a substantially similar structure in the battery module 20. Accordingly, only the structure of the battery cell 142 will be described in greater detail below. The battery cell 142 includes a body portion 160, a peripheral lip portion 162, and electrodes 164, 166 extending upwardly from the body portion 160. The peripheral lip portion 162 extends around the periphery of the body portion 160. The electrodes 164, 166 extend outwardly from the body portion 150 and have a voltage generated therebetween. The electrodes of the battery cells of the battery module 20 can be electrically coupled together either in series or in parallel depending upon a desired voltage and current of the battery module 20. In one exemplary embodiment, each battery cell is a lithium-ion battery cell. In alternative embodiments, the battery cells could be nickel-cadmium battery cells or nickel metal hydride battery cells for example. Of course, other types of battery cells known to those skilled in the art could be utilized.

Referring to FIGS. 3, 6, 7, and 8, the cooling fins 90, 92, 94, 96, 98, 100, 102, 104, 106, 108, 110, 112 are provided to conduct heat energy from the battery cells into the cooling fins. Each of the cooling fins have a substantially similar structure and are constructed from at least one of copper, aluminum, and steel. Accordingly, only the structure of the cooling fin 90 will be described in greater detail below. The cooling fin 90 includes a solid rectangular-shaped plate 180, tab portions 182, 184, 186, 188, and plastic end portions 190, 192.

The tab portions 182, 184 extend outwardly from a first edge of the rectangular-shaped plate 180. Further, the tab portions 182, 184 are bent perpendicular in a first direction with respect to the plate 180, such that the tab portions 182, 184 are disposed against a side surface of the battery cell assembly 62. The tab portions 182, 184 are also perpendicular to a front surface of the battery cell 144. The tab portions 182, 184 contact the cooling manifolds 120, 122, respectively, such that the cooling manifolds 120, 122 conduct heat energy away from the cooling fin 90.

The tab portions 186, 188 extend outwardly from a second edge of the rectangular-shaped plate 180. Further, the tab portions 186, 188 are bent perpendicular in a first direction with respect to the plate 180, such that the tab portions 186, 188 are disposed against a side surface of the battery cell assembly 62. The tab portions 186, 188 are also perpendicular to a front surface of the battery cell 144. The tab portions 186, 188 contact the cooling manifolds 124, 126, respectively, such that the cooling manifolds 124, 126 conduct heat energy away from the cooling fin 90.

The plastic end portions 190, 192 are disposed on a bottom end and a top end, respectively, of the cooling fin 90. The plastic end portions 190, 192 are ultrasonically welded to the cooling fin 90.

Referring again to FIG. 6, the battery cell assembly 60 includes a rectangular ring-shaped frame member 210, battery cells 212, 214, and a rectangular ring-shaped frame member 216. Each of the rectangular ring-shaped frame members 210, 216 have engagement features which allow the frame members 210, 216 to be coupled and secured together. As shown, both of the battery cells 212, 214 are secured between the rectangular ring-shaped frame members 210, 216. Further, the frame members 146, 210 of the battery modules 60, 62, respectively, have engagement features which allow the frame members 146, 210 to be coupled and secured together with the cooling fin 90 disposed therebetween.

Referring to FIGS. 1, 2, 9, 10 and 11, the cooling manifolds 120, 122, 124, 126 are configured to allow fluid to flow therethrough to remove heat energy from cooling fins contacting the cooling manifolds. The cooling manifolds 120, 122 are disposed on a first side of the battery module 20, and the cooling manifolds 124, 126 are disposed on a second side of the battery module 20. Further, the cooling manifolds 120, 122, 124, 126 are fluidly coupled between the conduits 28, 30, such that a fluid flows from the conduit 28 into the cooling manifolds and then the fluid flows through the cooling manifolds into the conduit 30. The cooling manifolds 120, 122, 124, 126 are coupled to the battery cell assemblies utilizing known coupling devices or adhesives, such as screws or glues for example.

Referring to FIGS. 2, 9, 10 and 11, the structure of the cooling manifolds 120, 122, 124, 126 are substantially similar to one another. Accordingly, only the structure the cooling manifold 120 will be discussed in greater detail below. The cooling manifold 120 includes an outer rectangular ring-shaped wall 230 that extends in a first direction and inner walls 230, 232, 234, 236, 238, 240, 242, 244, 246, 248, 250, 252, 254, 256 disposed therein. The outer rectangular ring-shaped wall 230 and the inner walls disposed inside an interior region defined by the wall 230 further define flow channels 270, 272, 274, 276, 278, 280, 282, 284, 286, 288, 290, 292, 294, 296 therein. The flow channels are configured to allow fluid the flow therethrough to extract heat energy from the cooling manifold 120. The cooling manifolds are constructed from a least one of copper and aluminum.

Figure 2:
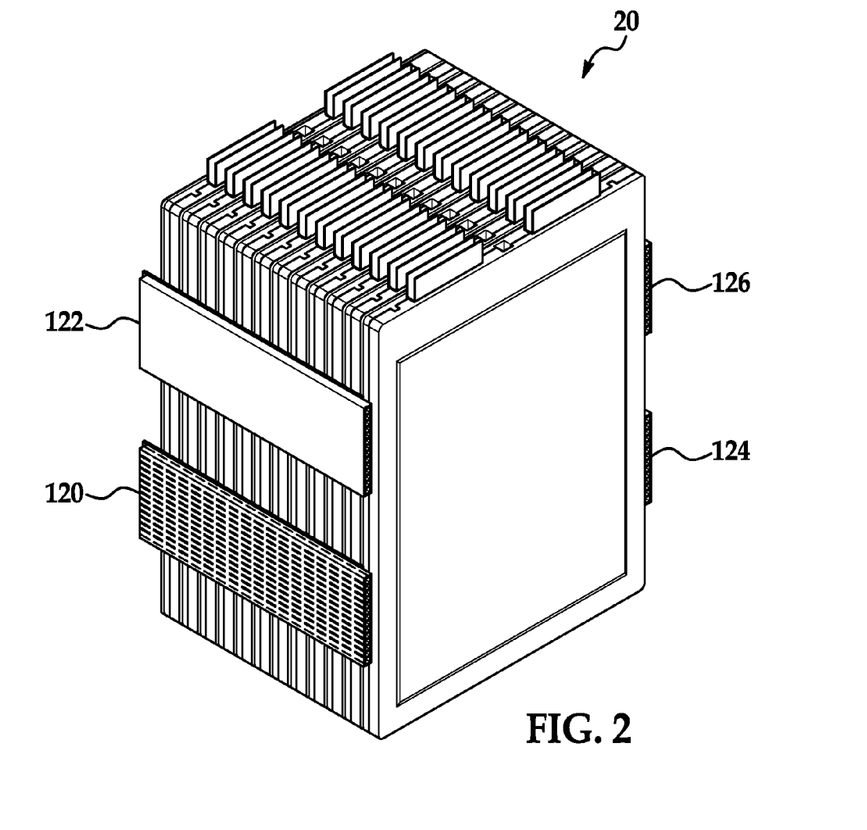
FIG. 2 is a schematic of the battery module utilized in the battery system of FIG. 1 in accordance with another exemplary embodiment.

Referring to FIGS. 1 and 2, during operation, in one exemplary embodiment, heat energy is conducted from the battery cell assemblies 60, 62, 64, 66, 68, 70, 72, 74, 76, 78, 80, 82 into the cooling fins 90, 92, 94, 96, 98, 100, 102, 104, 106, 108, 110, 112 to cool the battery cell assemblies. The cooling fins further conduct heat energy to the cooling manifolds 120, 122, 124, 126. A fluid flows through the cooling manifolds 120, 122, 124, 126 to conduct heat energy from the cooling manifolds into the fluid.

The cooling fins 90, 92, 94, 96, 98, 100, 102, 104, 106, 108, 110, 112 and the cooling manifolds 120, 122, 124, 126 maintain the battery cells within a desired temperature range, and in particular can maintain the battery cells at a temperature less than a threshold temperature level. In one exemplary embodiment, the desired temperature range is 15° Celsius-35° Celsius. In another exemplary embodiment, the threshold temperature level is 40° Celsius.

Referring again to FIG. 1, in one exemplary embodiment, the compressor 22 is configured to pump a refrigerant through the conduit 28 into cooling manifolds 120, 122, 124, 126 of the battery module 20 in response to a control signal from the microprocessor 40. The conduit 30 is also fluidly coupled to the cooling manifolds 120, 122, 124, 126 of the battery module 20. The conduit 30 receives refrigerant from the cooling manifolds 120, 122, 124, 126 and routes the refrigerant to the condenser 24.

The condenser 24 is provided to extract heat energy from the refrigerant flowing therethrough to cool the refrigerant. As shown, a conduit 32 is fluidly coupled between the condenser 24 and the compressor 22. After exiting the condenser 24, the refrigerant is pumped through the conduit 32 to the compressor 22.

The temperature sensor 36 is provided to generate a signal indicative of a temperature level of the battery cells disposed in the housing 60 that is received by the microprocessor 40.

The fan 38 is provided to urge air past the condenser 24 to cool the condenser 24 in response to a control signal from the microprocessor 40. As shown, the fan 38 is disposed proximate to the condenser 24.

The microprocessor 40 is provided to control operation of the battery system 10. In particular, the microprocessor 40 is configured to generate a control signal for inducing the compressor 22 to pump refrigerant through cooling manifolds of the battery module 20 when the signal from the temperature sensor 36 indicates a temperature level of the battery cells is greater than a predetermined temperature level. Further, the microprocessor 40 is configured to generate another control signal for inducing the fan 38 to blow air across the condenser 24 when the signal from the temperature sensor 36 indicates the temperature level of the battery cells is greater than the predetermined temperature level.

Figures 7, 8, 9:
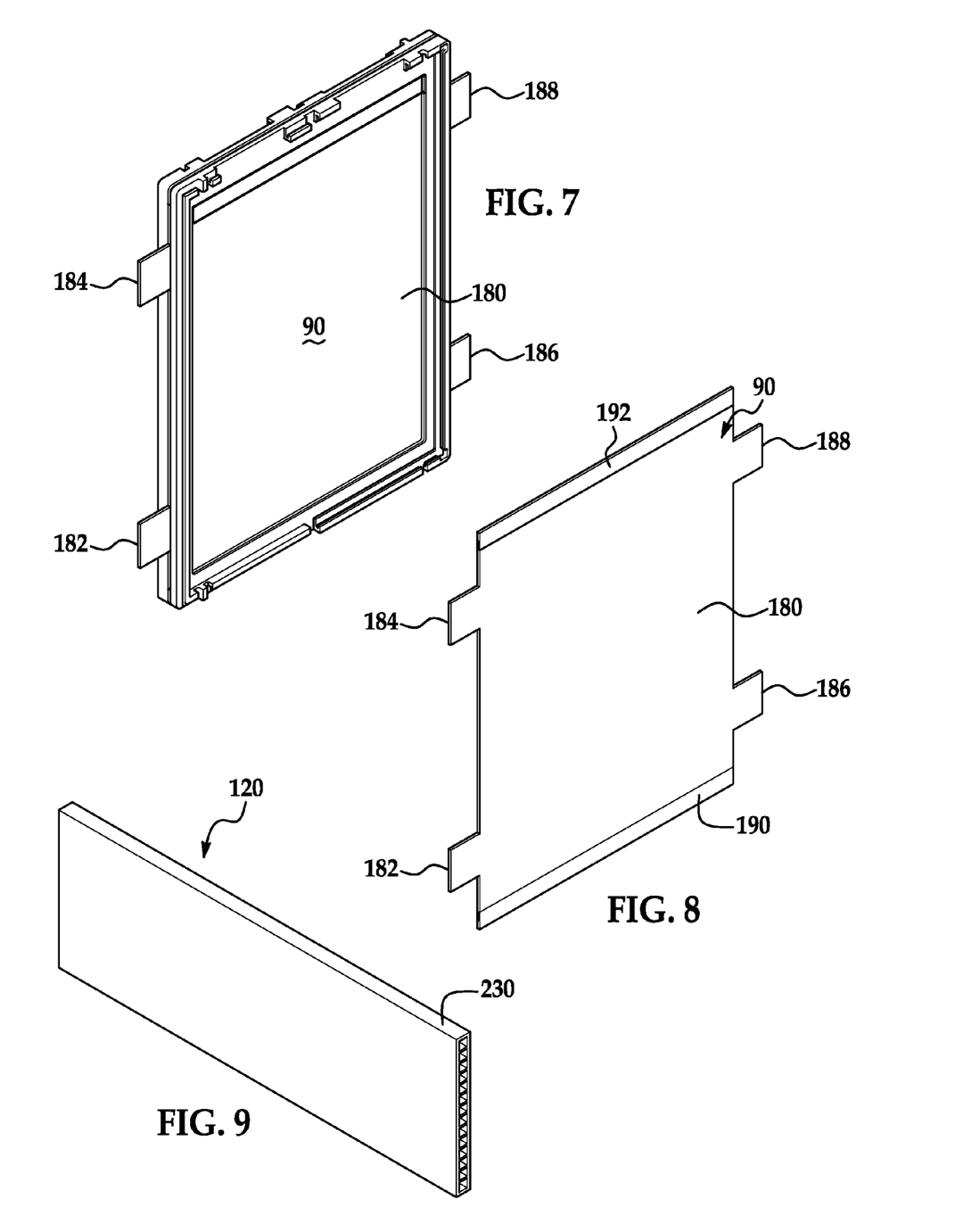
FIG. 7 is a schematic of two rectangular ring-shaped walls surrounding a cooling fin utilized in the battery module of FIG. 2.
FIG. 8 is schematic of the cooling fin of FIG. 7.
FIG. 9 is a schematic of a cooling manifold utilized in the battery module of FIG. 2.
Figure 10:
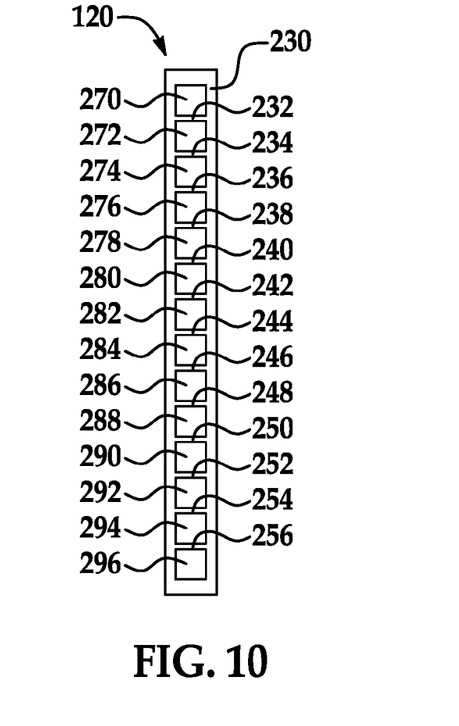
FIG. 10 is a cross-sectional schematic of the cooling manifold of FIG. 9.
Figure 11:
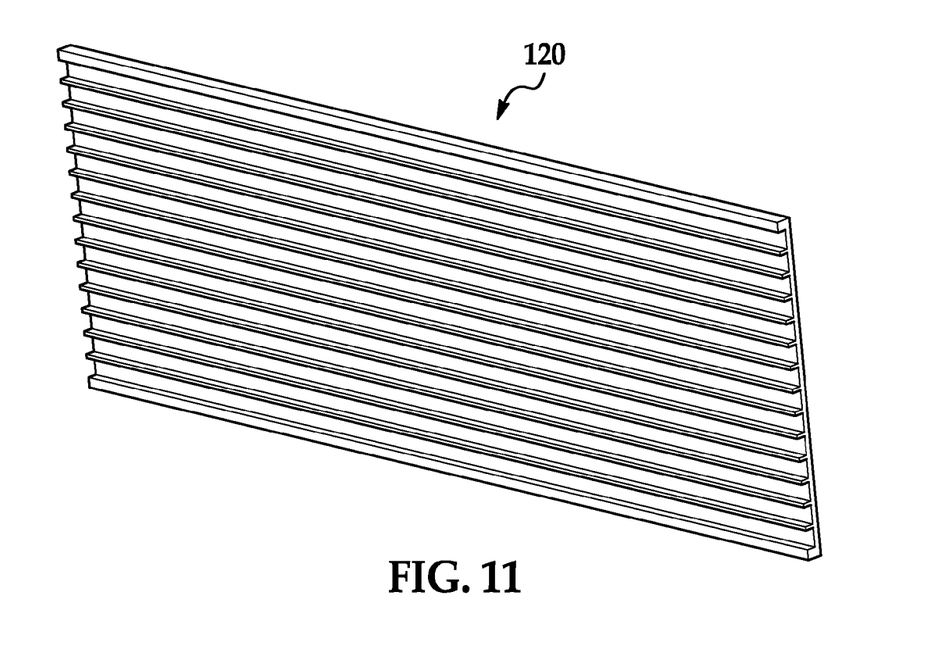
FIG. 11 is another cross-sectional schematic of the cooling manifold of FIG. 9.
Figure 12:
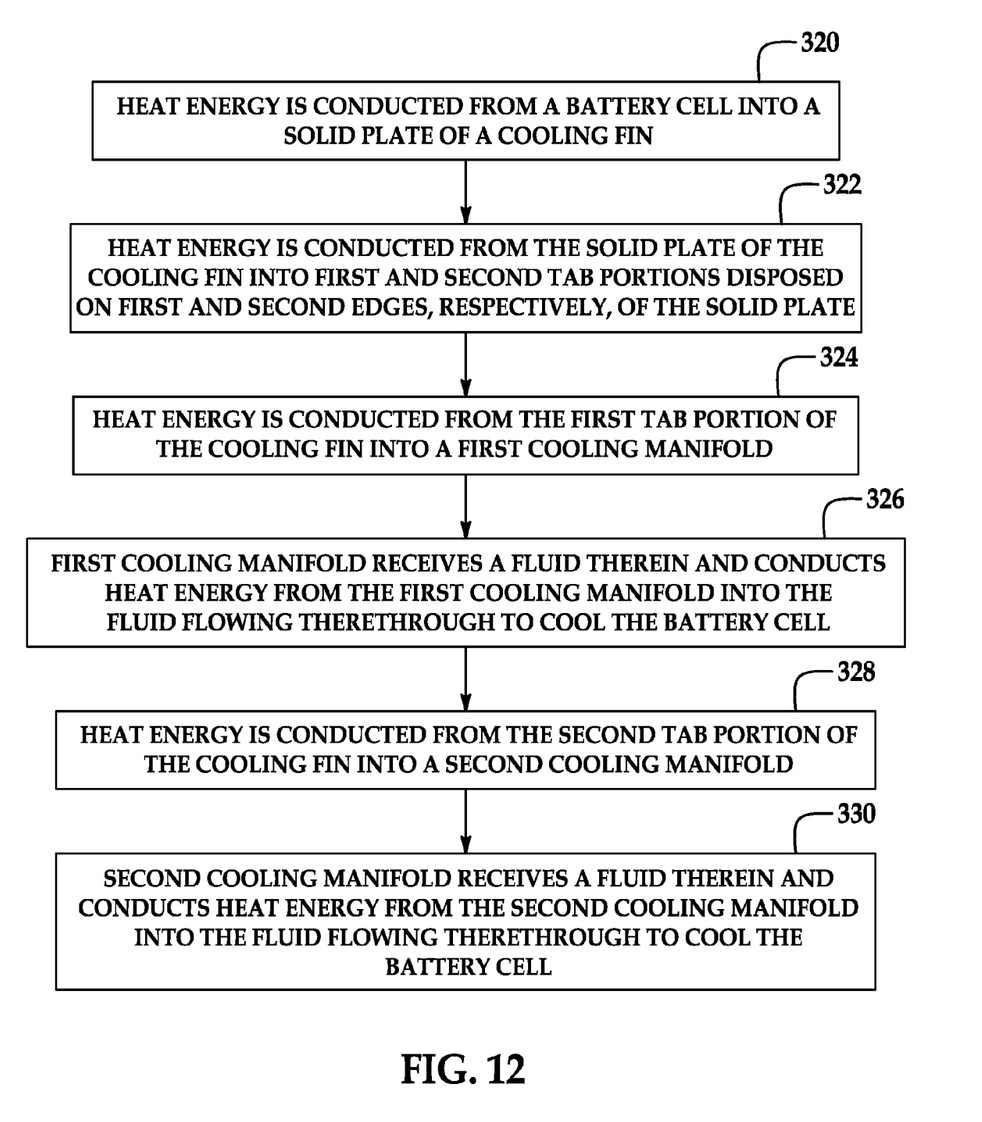
FIG. 12 is a flowchart of a method for cooling a battery module in accordance with another exemplary embodiment.

Referring to FIGS. 6, 7 and 12, a flowchart of a method for cooling the battery module 20 having a battery cell will now be explained. For purposes of simplicity, only one battery cell, one cooling fin, and two cooling manifolds will be described.

At step 320, heat energy is conducted from the battery cell 144 into the solid plate 180 of the cooling fin 90.

At step 322, heat energy is conducted from the solid plate 180 of the cooling fin 90 into tab portions 182, 186 disposed on first and second edges, respectively, of the solid plate 180.

At step 324, heat energy is conducted from the tab portion 182 of the cooling fin 90 into the cooling manifold 120.

At step 326, the cooling manifold 120 receives a fluid therein and conducts heat energy from the cooling manifold 120 into the fluid flowing therethrough to cool the battery cell 144.

At step 328, heat energy is conducted from the tab portion 186 of the cooling fin 90 into the cooling manifold 124.

At step 330, the cooling manifold 124 receives a fluid therein and conducts heat energy from the cooling manifold 124 into the fluid flowing therethrough to cool the battery cell 144.

Figure 13:
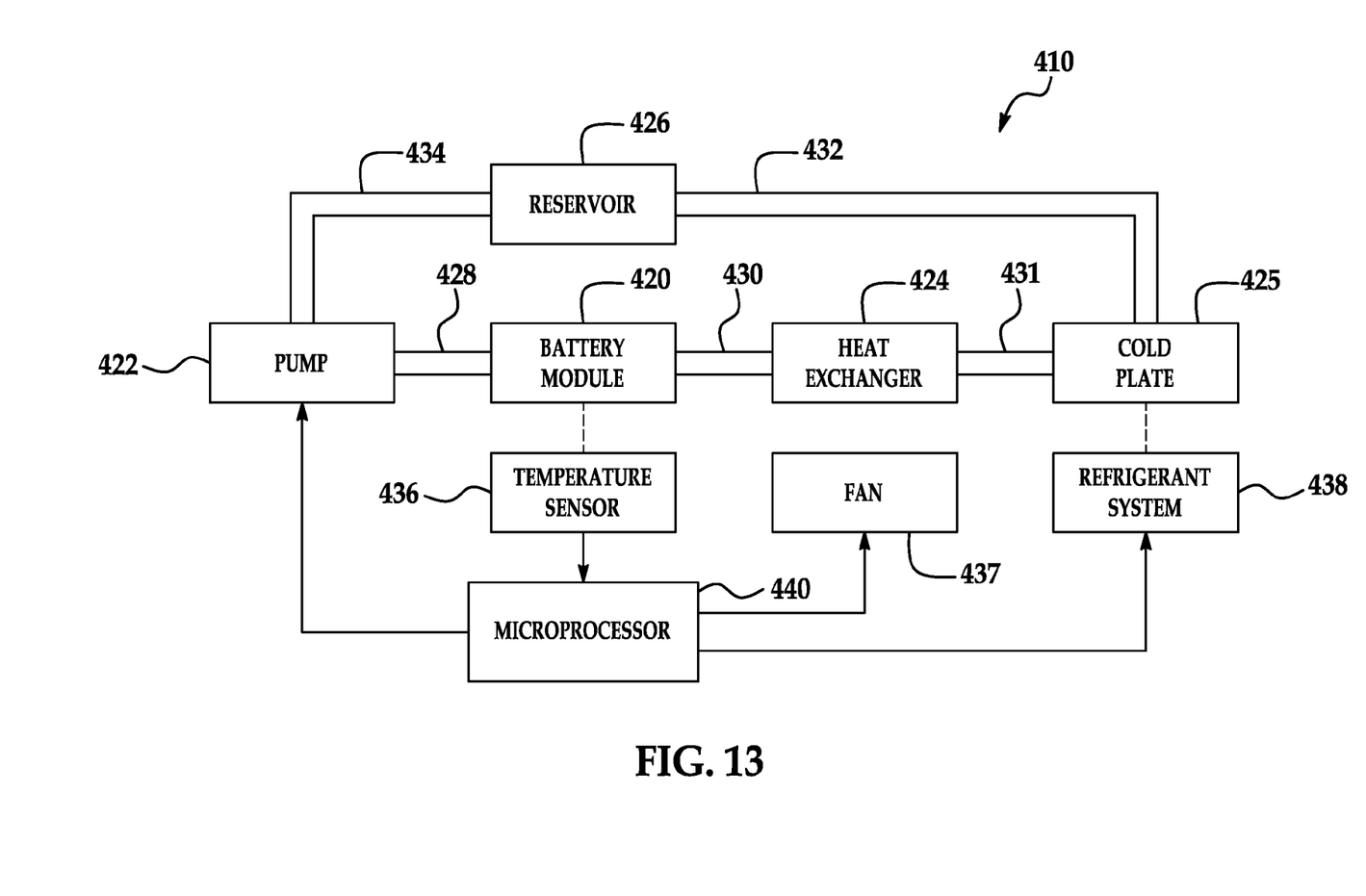
FIG. 13 is a schematic of another battery system in accordance with another exemplary embodiment.

Referring to FIG. 13, a battery system 410 for generating electrical power in accordance with another exemplary embodiment is illustrated. The battery system 410 includes a battery module 420, a pump 422, a heat exchanger 424, a cold plate 425, a reservoir 426, conduits 428, 430, 431, 432, 434, a temperature sensor 436, a fan 437, a refrigerant system 438, and a microprocessor 440. The primary difference between the battery system 410 and the battery system 10 is that the battery system 410 utilizes a coolant instead of a refrigerant to cool the battery module 420.

The battery module 420 has an identical structure as the battery module 20 discussed above.

The pump 422 is configured to pump a coolant through the conduit 428 into cooling manifolds of the battery module 420 in response to a control signal from the microprocessor 440. As shown, the conduit 428 is fluidly coupled between the pump 422 and the battery module 420, and the conduit 430 is fluidly coupled between the cooling manifolds of the battery module 420 and the heat exchanger 424. After exiting the cooling manifolds of the battery module 420, the coolant is pumped through the conduit 430 to the heat exchanger 424.

The heat exchanger 424 is provided to extract heat energy from the coolant flowing therethrough to cool the coolant. As shown, a conduit 431 is fluidly coupled between the heat exchanger 424 and the cold plate 425. After exiting the heat exchanger 424, the coolant is pumped through the conduit 431 to the cold plate 425.

The fan 437 is provided to urge air past the heat exchanger 424 to cool the heat exchanger 424 in response to a control signal from the microprocessor 440. As shown, the fan 437 is disposed proximate to the heat exchanger 424.

The cold plate 425 is provided to extract heat energy from the coolant flowing therethrough to further cool the coolant. As shown, a conduit 422 is fluidly coupled between the cold plate 425 and the reservoir 426. After exiting the cold plate 425, the coolant is pumped through the conduit 432 to the reservoir 426.

The reservoir 426 is provided to store at least a portion of the coolant therein. As shown, a conduit 434 is fluidly coupled between the reservoir 426 and the pump 422. After exiting the reservoir 426, the coolant is pumped through the conduit 434 to the pump 422.

The temperature sensor 436 is provided to generate a signal indicative of a temperature level of at least one of the battery cells in the battery module 420, that is received by the microprocessor 440.

The refrigerant system 438 is provided to cool the heat exchanger 424 in response to a control signal from the microprocessor 440. As shown, the refrigerant system 438 is operably coupled to the cold plate 425.

The microprocessor 440 is provided to control operation of the battery system 410. In particular, the microprocessor 440 is configured to generate a control signal for inducing the pump 422 to pump refrigerant through the cooling manifolds of the battery module 420 when the signal from the temperature sensor 436 indicates a temperature level of at least one of the battery cells is greater than a predetermined temperature level. Further, the microprocessor 440 is configured to generate another control signal for inducing the fan 437 to blow air across the heat exchanger 424 when the signal from the temperature sensor 436 indicates the temperature level of at least one of the battery cells is greater than the predetermined temperature level. Further, the microprocessor 440 is configured to generate another control signal for inducing the refrigerant system 438 to cool the cold plate 425 when the signal from the temperature sensor 436 indicates the temperature level of at least one of the battery cells is greater than the predetermined temperature level.

The battery module and the method for cooling the battery module provide a substantial advantage over other modules and methods. In particular, the battery module and the method provide a technical effect of cooling a battery cell in the battery module utilizing cooling fins with external tab portions that contact a cooling manifold to transfer heat energy from battery cells to the cooling manifold to cool the battery cells.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

What is claimed is:
1. A battery module, comprising:
a battery cell; and
a cooling fin disposed adjacent to the battery cell, the cooling fin having a solid plate and first and second tab portions extending from first and second edges, respectively, of the solid plate, the first and second tab portions configured to be bent perpendicular with respect to the solid plate and extending in a first direction, the cooling fin configured to extract heat energy from the battery cell thereto;

a first cooling manifold that contacts the first tab portion of the cooling fin, the first cooling manifold having an outer rectangular ring-shaped wall extending in the first direction that defines at least one flow channel therethrough configured to receive a fluid therethrough, the first cooling manifold configured to conduct heat energy from first tab portion of the cooling fin into the fluid flowing through the first cooling manifold to cool the battery cell; and a second cooling manifold that contacts the second tab portion of the cooling fin, the second cooling manifold having at least one flow channel extending therethrough configured to receive a fluid therethrough, the second cooling manifold configured to conduct heat energy from the cooling fin into the fluid flowing through the second cooling manifold to cool the battery cell.

2. The battery module of claim 1, wherein the solid plate of the cooling fin is rectangular shaped.

3. The battery module of claim 1, wherein the cooling fin is constructed of at least one of copper, aluminum, and steel.

4. The battery module of claim 1, wherein the first cooling manifold is constructed of at least one of copper and aluminum.

5. The battery module of claim 1, wherein the fluid is a coolant.

6. The battery module of claim 5, wherein the coolant comprises at least one of ethylene glycol and propylene glycol.

7. The battery module of claim 1, wherein the first cooling manifold further includes an inner wall disposed within an interior region defined by the outer rectangular ring-shaped wall, the inner wall and the outer rectangular ring-shaped wall defining at least another flow channel therethrough that is configured to receive the fluid therethrough.

8. The battery module of claim 1, further comprising first and second rectangular ring-shaped frame members configured to hold the battery cell and the solid plate of the cooling fin therebetween.

9. The battery module of claim 1, wherein the fluid is a refrigerant.

* * * * *